Aug. 27, 1935.  J. S. HODDY  2,012,509
CLUTCH FOR ELECTRIC MOTORS
Original Filed Oct. 9, 1933
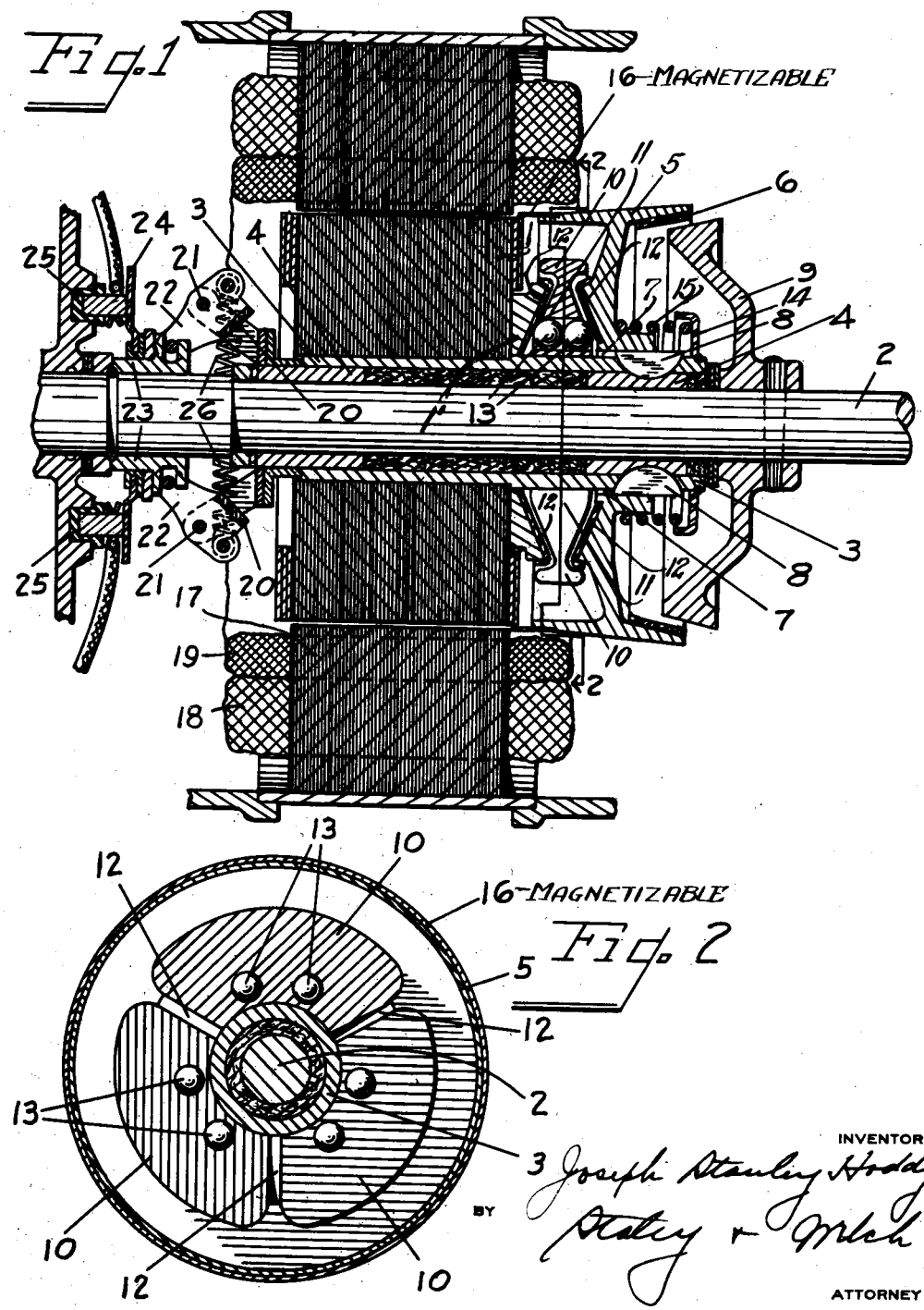
INVENTOR
Joseph Stanley Hoddy
BY
Staley & Welch
ATTORNEY Patented Aug. 27, 1935

2,012,509

UNITED STATES PATENT OFFICE 2,012,509

CLUTCH FOR ELECTRIC MOTORS

Joseph Stanley Hoddy, Springfield, Ohio, assignor to Robbins & Myers Inc., Springfield, Ohio, a corporation of Ohio Application October 9, 1933, Serial No. 692,787
Renewed February 4, 1935

11 Claims. (Cl. 172—120)

This invention relates to clutches, it more particularly relating to a clutch which is operated by means responsive to centrifugal force, and more especially to a clutch which is adapted for use in connection with a single phase alternating current induction motor of the split phase type, although not necessarily confined to that particular use.

In clutches of this type it has heretofore been usual to employ a spring sufficiently strong to hold the centrifugally operated means, generally weights, from operation until after a predetermined speed of the motor has been reached so that the amount of force exerted by such means to hold the clutch members in engagement at times does not greatly exceed the resisting force of the spring, causing slippage of the clutch when under load. It is the object of my invention to overcome this difficulty by providing a comparatively weak spring to disengage the clutch members at a low speed of the motor and to furnish additional means to hold the weights from operation when starting the motor until after the motor has reached the desired predetermined speed, such additional means being rendered inactive when the movable clutch member has been engaged with the companion clutch member so that practically the full force of the centrifugal weights may be exerted to hold the clutch members in engagement.

A further and more specific object of the invention is to provide a magnetizable element energized by the magnetic flux set up by the rotor and having the characteristic of initially holding the clutch members disengaged by exerting a pull upon the movable clutch member to resist the action of the centrifugally operated means and to thereafter upon a predetermined speed of the rotor permit the clutch members to be engaged by the action of the centrifugally operated devices, said magnetizable means being rendered ineffective to further resist the action of such centrifugal devices as long as the clutch is engaged.

In the accompanying drawing:

Fig. 1 is a view partly in elevation and partly in longitudinal section of the motor and clutch devices.

Fig. 2 is a vertical section on the line 2—2 of Fig. 1 with the stator of the motor omitted.

Referring to the drawing, I represents the rotor of an electric motor and 2 a shaft to be driven. The rotor is secured to a sleeve 3 which has bearings 4 rotatably mounted on the shaft. A shiftable clutch member is indicated at 5, this member having an internal cone-shaped clutch face which is preferably lined with cork 6. The clutch member 5 has a keyway 7 to receive a key 8 which is connected with the sleeve 3. There is shown at 9 a companion clutch member which is pinned to the shaft 2 and has an exterior cone-shaped clutch face to cooperate with the clutch face of the member 5.

The clutch member 5 is adapted to be shifted by a series of centrifugally operated segmental weights 10, each of which has a wedge-shaped portion 11 positioned in a wedge-shaped annular pocket formed by outwardly converged walls, one of which is on a ring 1' secured to the rotor and the other on the shiftable clutch member 5. These faces are preferably lined with wear resisting material 12 and each of the weights preferably has pockets in which are located anti-friction balls 13.

Interposed between the shiftable clutch member 5 and a collar 14 located on the end of the sleeve 3 is a comparatively weak coil spring 15, the purpose of which is to disengage the clutch members when the speed of the motor has decreased to a predetermined degree by shifting the clutch member 5 away from the member 9 and causing the weights to be returned to their innermost position, which is the only purpose of this weak spring. The spring offers little resistance to the action of the weights in moving the shiftable clutch member into engagement and holding it there so that so far as this spring is concerned practically the full force of the centrifugal action of the weights may be employed to hold the clutch members in engagement.

As it is necessary, however, to prevent the operation of the weights until after the motor has reached a predetermined speed, means other than the spring is employed to prevent the shifting of the shiftable clutch member until after that predetermined speed has been reached. This additional means is primarily the magnetic force exerted by the leakage flux of the motor, and to that end there is secured to the shiftable clutch member 5 a magnetizable band 16 which projects in the present case into the effective field of the rotor leakage flux when the shiftable clutch member is in disengaged position.

The magnetic force of the motor consists of two components, one of which is due to the leakage flux of the stator windings and the other, which is the more important component in the present case, is due to the leakage flux of the rotor end ring. The reason that the leakage flux of the rotor end ring is the more important component in the present case is due to the fact that for a more practical construction it is possible to place the band 16 in a more definite position with relation to the rotor end ring leakage flux than with the leakage flux of the stator windings. It is a characteristic of the rotor end ring component to exert in the present case a large magnetic pull when the motor starts and little or no pull at high speeds, due to the greater current existing at the low speed. This magnetic force decreases roughly as the square of the speed, while the centrifugal force of the weights increases somewhat more rapidly than the square of the speed as the weights move out. As the speed of the rotor increases, therefore, the centrifugal force of the weights will become greater than the combined forces of the magnetizable element and the weak release spring and the weights become effective to shift the movable clutch member 5 into engagement with the companion clutch member 9. At this point the magnetizable band has moved away from the effective path of the motor leakage flux, and since the magnetic pull decreases roughly as the square of the distance, the magnetic pull becomes negligible with the result that the weak release spring forms the only opposition to the centrifugal force of the weights in holding the clutch members engaged.

As the torque which the driven shaft will deliver depends on the pressure between the friction surfaces of the clutch members, it will be seen that when the force of the magnet is removed, the centrifugal force exerted by the weights may not only be greater than necessary to carry the load but also makes it possible to use larger cone angles for the clutch faces and thereby remove the danger of the clutch faces sticking.

If the load should become too great for the motor, the speed decreases past the pull-out point until the force of the release spring 15 is greater than the centrifugal force of the weights and the clutch members are disengaged. As soon as the clutch becomes disengaged the rotor immediately speeds up and the action of again engaging the clutch members is repeated, the magnet serving to hold the weights from operating until after the desired motor speed has been reached.

Besides the advantage of providing that practically the full force of the centrifugal weights may be exerted in holding the clutch members in engagement, another advantage is that by the use of the magnetic force a relatively high speed of the motor is obtained before the clutch members are engaged, which makes it possible to start heavier loads than otherwise for the reason that not only is the stored energy in the rotor made available, but also since the speed is well above the pull-out point the motor receives the load at a more favorable point on its speed-torque curve. This feature is valuable when the motor is required to start its load on low voltage. Another feature which is sometimes an advantage is that when the clutch is in the disengaged position and consequently the magnetizable element within the effective path of the leakage flux of the rotor, the leakage reactance of the motor is higher than normal with the result that there is a smaller rush of current at starting. With the clutches engaged, however, the magnetizable element is removed from the effective path of the rotor flux so that there is a very slight effect upon the running performance of the motor.

The rotor 1 is shown in the present instance of the squirrel cage type, and the stator is indicated at 17. The main winding of the stator is shown at 18 and a starting winding at 19 which starting winding is cut out at a predetermined speed of the rotor by a centrifugal switch. This switch is shown at the left in Fig. 1 and employs centrifugal weights 20 mounted upon the pivots 21 and having arms 22 which are engaged with a grooveway in a slidable sleeve 23 carrying a contact disk 24 which cooperates with the stationary contacts 25 to establish the circuit through the starting winding, the contacts being held together by the coil springs 26. At a predetermined speed the weights respond to centrifugal force and separate the contacts.

Having thus described my invention, I claim:

1. In combination, an electric motor including its rotor, a shiftable clutch member rotatable with said rotor, a companion clutch member, rotatable means rotated by the rotor and responsive to centrifugal force for shifting said shiftable clutch member, and a magnetizable element responsive to the magnetic flux of the motor to initially oppose the centrifugal force of the rotatable means until a predetermined speed of said rotatable means has been reached.

2. In combination, an electric motor including its rotor, a shiftable clutch member rotatable with said rotor, a companion clutch member, rotatable means rotated by the rotor and responsive to centrifugal force for shifting said shiftable clutch member, a magnetizable element responsive to the magnetic flux of the motor to initially oppose the centrifugal force of the rotatable means until a predetermined speed of said rotatable means has been reached, and a comparatively weak spring to release said clutch members upon a reduction in speed in said rotatable means.

3. In combination, an electric motor including its rotor, a shiftable clutch member rotatable with the rotor, a companion clutch member, rotatable means rotatable with the rotor responsive to centrifugal force for shifting said shiftable clutch member, a magnetizable element on said shiftable clutch member responsive to the magnetic flux of the motor to initially oppose the centrifugal force of said rotatable means until a predetermined speed of said rotatable means has been reached, the shifting of said shiftable clutch member removing the magnetizable element thereon from the effective field of the flux of the motor.

4. In combination, an electric motor including its rotor, a shiftable clutch member rotatable with the rotor, a companion clutch member, rotatable means rotatable with the rotor responsive to centrifugal force for shifting said shiftable clutch member, a magnetizable element on said shiftable clutch member responsive to the magnetic flux of the motor to initially oppose the centrifugal force of said rotatable means until a predetermined speed of said rotatable means has been reached, the shifting of said shiftable clutch member removing the magnetizable element thereon from the effective field of the flux of the motor, and a comparatively weak spring to release said clutch members upon a reduction in speed in said rotatable means.

5. In combination, an electric motor including its rotor, a shiftable clutch member rotatable with the rotor, a companion clutch member, a driven shaft to which said companion clutch member is connected, a ring-like member driven by the rotor, said ring-like member and shiftable clutch member being provided with opposed inclined faces to form an outwardly converged annular pocket, a plurality of weights each having an inclined portion seated in said pocket, said weights being responsive to centrifugal force and acting to shift said shiftable clutch member upon an outward movement thereof, a magnetizable element connected with said shiftable clutch member and responsive to the magnetic flux of the motor until a predetermined speed of said rotatable means has been reached, the shifting of said shiftable clutch member removing the magnetizable element thereon from the effective field of the flux of said motor.

6. In combination, an electric motor including its rotor, a shiftable clutch member rotatable with the rotor, a companion clutch member, a driven shaft to which said companion clutch member is connected, a ring-like member driven by the rotor, said ring-like member and shiftable clutch member being provided with opposed inclined faces to form an outwardly converged annular pocket, a plurality of weights each having an inclined portion seated in said pocket, said weights being responsive to centrifugal force and acting to shift said shiftable clutch member upon an outward movement thereof, a magnetizable element connected with said shiftable clutch member and responsive to the magnetic flux of said motor until a predetermined speed of said rotatable means has been reached, the shifting of said shiftable clutch member removing the magnetizable element thereon from the effective field of the flux of said motor, and a comparatively weak spring to release said clutch members upon a reduction in speed in said rotatable means.

7. In combination, an electric motor including its rotor, said rotor being rotatably mounted on said shaft, a shiftable clutch member rotatably mounted on said shaft, a companion clutch member connected with said shaft, a plurality of weights encircling said shaft rotatable with said rotor and responsive to centrifugal force, a magnetizable element on said shiftable clutch member and responsive to the magnetic flux of said motor to oppose the centrifugal force of said weights until a predetermined speed of said rotor has been reached, said magnetizable element being removed from the effective field of the magnetic flux of the motor when said weights shift said shiftable clutch member into engagement with said companion clutch member.

8. In combination, an electric motor including its rotor, said rotor being rotatably mounted on said shaft, a shiftable clutch member rotatably mounted on said shaft, a companion clutch member connected with said shaft, a plurality of weights encircling said shaft rotatable with said rotor and responsive to centrifugal force, a magnetizable element on said shiftable clutch member and responsive to the magnetic flux of said motor to oppose the centrifugal force of said weights until a predetermined speed of said rotor has been reached, said magnetizable element being removed from the effective field of the magnetic flux of the motor when said weights shift said shiftable clutch member into engagement with said companion clutch member, and a comparatively weak spring to release said clutch members upon a reduction in speed in said rotatable means.

9. In combination, an electric motor including its rotor, a centrifugally operated clutch member rotatable with said rotor, a companion clutch member, and a magnetizable element responsive to the magnetic flux of said motor to initially oppose the movement of said first-mentioned clutch member.

10. In combination, an electric motor including its rotor, a centrifugally operated clutch member rotatable with said rotor, a companion clutch member, a magnetizable element responsive to the magnetic flux of said motor to initially oppose the movement of said first-mentioned clutch member, and a spring to release said clutch member upon a reduction of speed of said rotor.

11. In combination, an electric motor including its rotor, a centrifugally operated clutch member rotatable with said rotor, a companion clutch member, and a magnetic ring connected with said first-mentioned clutch member and responsive to the magnetic flux of said motor to initially oppose the movement of said first-mentioned clutch member.

JOSEPH STANLEY HODDY.